Feb. 11, 1930.	J. JONAS	1,746,259
TRANSFORMER APPARATUS
Filed Aug. 22, 1927

Witness
R. Burkhardt

Inventor
Julius Jonas,
By Cromwell, Greist & Warden
Attys

Patented Feb. 11, 1930

1,746,259

UNITED STATES PATENT OFFICE

JULIUS JONAS, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

TRANSFORMER APPARATUS

Application filed August 22, 1927, Serial No. 214,492, and in Germany August 26, 1926.

This invention relates to transformer apparatus and has particular relation to apparatus for converting quarter-phase currents into direct currents.

Among the objects of the invention is an improved organization for combining a rectifier of the three-phase type or a multiple thereof with a novel transformer converting quarter-phase currents into polyphase currents suitable for supplying said rectifier.

A particular object of the invention is the provision of a transformer for converting quarter-phase currents into three-phase currents or a multiple of three-phase currents utilizing a three-phase core and having symmetrical and balanced grouping of the primary as well as the secondary windings on said core.

Figure 1:
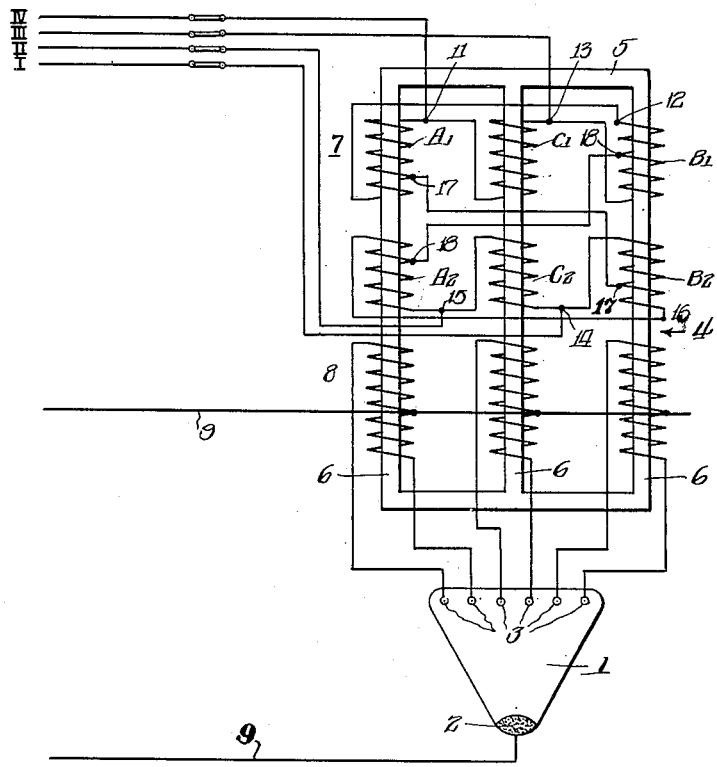
Figure 2:
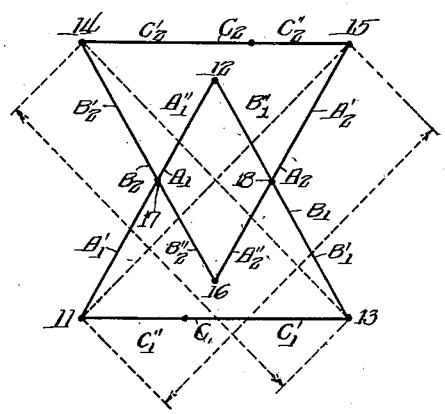

The foregoing and other objects of the invention will be best understood from the accompanying drawings, wherein Fig. 1 is a circuit diagram of a rectifier installation embodying one form of the invention; and Fig. 2 is a vector diagram illustrating diagrammatically the relationship of the primary windings of the transformer in Figure 1.

Large power rectifiers, such as of the mercury-vapor type, have been to a certain extent standardized for operation with three-phase alternating current or a multiple thereof. Very often the problem arises of adapting such rectifiers for supply from a quarter-phase network, and the present invention is concerned with the provision of an economical and efficient transformer unit for converting quarter-phase currents into three-phase currents, or in general, three-$m$-phase currents, $m$ being an integer, suitable for supplying rectifiers of the foregoing type.

In general, windings for generating or transforming two-phase currents are made up of two separate single-phase windings suitably connected to constitute a quarter-phase system. Each of these windings corresponds to one phase of the quarter-phase system, the windings being arranged either on separate magnetic circuits or, if a single core is used, the two-phase windings are so arranged thereon that their electrical axes are at right angles. The problem often arises, however, as in the present case, of adapting a three-phase winding for use on a two-phase system, or vice versa. In addition to the problem of supplying three-phase rectifiers, as explained above, a requirement of such nature may be made, for instance, where an alternator is designed to operate on two-phase currents at one time and subsequently to be changed over for three-phase operation, or where a transformer is occasionally required to convert two-phase currents into three-phase currents.

In the design of transformer windings and transformers suitable for operation on quarter-phase as well as on three-phase systems it is of great advantage to make the windings perfectly balanced both with respect to three-phase as well as two-phase operation. It is desirable to have the windings uniformly distributed on the core legs, the core being preferably arranged in the form of the conventional three-phase transformer cores. In this way it is possible to avoid dissimilarity in the behavior of the windings under different operating conditions and to secure symmetrical current flow, voltage drop, copper distribution and number of turns on the individual phases or legs of the transformer.

According to the invention a transformer of foregoing character suitable for operation both on quarter-phase as well as on three-phase currents is obtained by utilizing a three-phase core having two symmetrical delta-connected phase windings so arranged thereon that the two-phase line may be directly connected to terminal taps on said three-phase windings. Since only symmetrical three-phase delta-connected windings are employed, a uniform number of turns per core leg will be obtained. On each of the core legs the same amount of copper is used and loaded to uniform degree. By subdividing and suitably sandwiching or interspersing the winding elements and closely interlinking the primary and secondary windings on the core legs, perfect symmetry of the voltage and current conditions in the quarter-phase as well as in the three-phase system will be obtained. A form of the invention embodying such arrangement is illustrated in Figures 1 and 2.

A six-phase mercury arc rectifier 1 having a cathode 2 and six anodes 3 is arranged to be supplied from a quarter-phase alternating-current supply line I—IV through a transformer 4 of special construction, explained above. The transformer comprises a three-phase core 5 having three core legs 6. Mounted on the three core legs 6 is a primary transformer winding 7 arranged to be supplied from the quarter-phase line I—IV, and a secondary winding 8, the latter being of the familiar six-phase star type used in conjunction with six-phase rectifiers, the direct current being derived from leads 9 connected to the cathode 2 of the rectifier and the neutral point of the six-phase star winding 8, respectively.

The primary winding 7 of the transformer, which constitutes in itself a distinct element of the invention, is illustrated vectorially in Figure 2 of the drawings. It comprises two symmetrical delta-connected three-phase windings $A_1$, $B_1$, $C_1$ and $A_2$, $B_2$, $C_2$ disposed on the legs 6 of the core respectively. The two delta windings have three-phase terminals 11, 12, 13, 14, 15, 16, respectively, and are so interconnected as to constitute a winding system having tap terminals for a two-phase alternating-current line.

The relative arrangement and the connections of the windings $A_1$, $B_1$, $C_1$ and $A_2$, $B_2$, $C_2$ appear clearly from Figure 2 in which the winding elements are represented by the voltage vectors induced therein during operation. There are thus two symmetrical delta-connected three-phase windings having equal numbers of turns. The several windings are so arranged and connected that the resultant vector system constitutes a square with the terminals 14, 15 of one delta-connected winding and the terminals 11, 13 of the other delta-connected winding at the points of the square. The two opposite sides of the square are formed by the equi-phase sides $C_1$, $C_2$ of the two equilateral triangles representing the delta-connected windings. Those sides of the triangles which are not collinear with the sides of the square lie within the area bound by the square and are electrically connected at their points of intersection 17, 18. Said points of intersection divide each of the intersecting windings into two parts, $A'_1$, $A''_1$, $B'_1$, $B''_1$, $A'_2$, $A''_2$, $B'_2$, $B''_2$, in the ratio of $$\frac{1}{\sqrt{3}} : 1 - \frac{1}{\sqrt{3}},$$

so that $$\frac{A''_1}{A'_1} = \frac{B''_1}{B'_1} = \frac{A''_2}{A'_2} = \frac{B''_2}{B'_2} = \frac{\sqrt{3}-1}{1}$$

The several windings are so arranged on the core that the winding sections $A'_1$, $A''_1$, $A'_2$, $A''_2$ and the corresponding secondary transformer windings are on one core leg; windings $B'_1$, $B''_1$, $B'_2$, $B''_2$ and the corresponding secondary windings are on the other core leg; and windings $C_1$, $C_2$ with the corresponding secondary windings are on the third leg. Although for purposes of clearness the several winding sections are diagrammatically shown in Figure 1 as being disposed on different portions of the transformer core legs, they are in the preferred transformer construction preferably interspersed. Thus the winding section $A'_1$ is suitably subdivided and interspersed with the winding section $A''_1$ and likewise $A'_2$ with $A''_2$, etc., the windings being disposed adjacently on the core legs and in close linkage with the corresponding secondary windings.

In the preferred arrangement the windings $C_1$ and $C_2$ that are on the third core leg and need not be interconnected are also grouped in sections like the interconnected windings, giving sections $$\frac{C'''_1}{C'_1} = \frac{C'''_2}{C'_2} = \frac{\sqrt{3}-1}{1}.$$

The winding sections $C'_1$, $C''_1$, $C'_2$, $C''_2$ are then interspersed and arranged with the corresponding secondary winding in the same way as the winding sections on the other two core legs, giving thus perfect symmetry as well as similarity in external appearance.

The cross section of the copper or conductor of the windings may be determined according to either of two methods. According to one method, the conductors are individually designed for the maximum current flowing therein. In this case the winding sections are designed corresponding to the following table giving the maximum currents flowing in the respective winding sections:

$C'_1$ $C''_1$ $C'_2$ $C''_2$ carry a maximum current of 0.5 $J_2$.

$A'_1$ $A'_2$ $B'_1$ $B'_2$ carry a maximum current of 0.778 $J_2$.

$A''_1$ $A''_2$ $B''_1$ $B''_2$ carry a maximum current of 0.253 $J_2$.

($J_2$ representing the effective value of the secondary current of the transformer).

The magnetizing currents have been neglected in the above table and the number of turns per core leg for each secondary phase has been assumed to equal the number of turns on one side of the primary delta. From the foregoing table it is clear that if the connections are made according to the invention, the total copper or winding material required for the transformer will be equal to that required for an ordinary three-phase to six-phase transformer. The number of turns and the total weight of copper per core leg is practically identical for each of the three phases.

According to the other method of dimensioning the winding, the cross-section of all windings is made uniform and arranged for the maximum current load in any of the sections. In the present case this would correspond to 0.778 $J_2$. With such arrangement the windings on all three core legs would be perfectly symmetrical as far as the amount of copper, but the primary winding would require 56% additional material than if designed according to the first method, raising the total copper for the whole transformer by 28%. Nothwithstanding this additional material requirement, the second method is somewhat preferable for practical installations by reason of the perfect symmetry of the entire organization, simplification in manufacture and identity of the construction of all the elements.

The principles of the invention explained above will suggest to those skilled in the art numerous other embodiments thereof. It is accordingly desired that the appended claims be given a broad construction commensurate with the scope of the invention.

I claim as my invention:

1. Transformer apparatus comprising two delta-connected symmetrical three-phase windings having phase winding elements of equal numbers of turns, said winding elements being so arranged and interconnected that the voltage vectors of said two winding systems constitute two overlapping equilateral triangles with two co-phasal elements of said two triangles constituting opposite sides of a square and the other elements of said triangles falling within the area of said square, said windings being interconnected at points corresponding to the intersection of the sides of the triangles falling within the area of the square, and tapping connections for said windings on points corresponding to the corners of said square.

2. Transformer apparatus comprising two delta-connected symmetrical three-phase windings having phase winding elements of equal numbers of turns, said winding elements being so arranged and interconnected that the voltage vectors of said two winding systems constitute two overlapping equilateral triangles with two co-phasal elements of said two triangles constituting opposite sides of a square and the other elements of said triangles falling within the area of said square, said windings being interconnected at points corresponding to the intersection of the sides of the triangles falling within the area of the square, tapping connections for said windings on points corresponding to the corners of said square, and a three-phase magnetic core for said windings, said windings constituting groups of symmetrical co-phasal elements arranged on the phases of said core.

3. Transformer apparatus comprising a three-phase core, a symmetrical delta-connected three-phase winding on said core, a second symmetrical delta-connected three-phase winding on said core, said two delta-connected windings being so interconnected that the voltage vectors corresponding to said windings constitute two overlapping equilateral triangles, two co-phasal sides of said triangles constituting opposite sides of a square with the other sides of said triangles falling within the area of said square, the winding sides corresponding to the sides of the triangles falling within the area of said square being interconnected at the points of intersection of the corresponding sides, quarter-phase terminal connections for said windings at points thereon corresponding to the corners of said square, and means cooperating with said windings for utilizing the same to transform balanced quarter-phase currents into balanced three-phase currents, or vice versa.

4. Transformer apparatus comprising a three-phase core, a symmetrical delta-connected three-phase winding on said core, a second symmetrical delta-connected three-phase winding on said core, said two delta-connected windings being so interconnected that the voltage vectors corresponding to said windings constitute two overlapping equilateral triangles, two co-phasal sides of said triangles constituting opposite sides of a square with the other sides of said triangles falling within the area of said square, the winding sides corresponding to the sides of the triangles falling within the area of said square being interconnected at the points of intersection of the corresponding sides, quarter-phase terminal connections for said windings at points thereon corresponding to the corners of said square, and an additional three-$m$-phase winding symmetrically arranged on said core, $m$ being an integer, said additional winding cooperating in transformer relation with the quarter-phase currents circulated through said quarter-phase terminal connections.

5. Apparatus according to claim 4, characterized by the fact that the winding elements of all the phases have the same current-carrying capacity in respect to operation as three-phase windings.

6. Transformer apparatus comprising a three-phase core, a symmetrical delta-connected three-phase winding on said core, a second symmetrical delta-connected three-phase winding on said core, said two delta-connected windings being so interconnected that the voltage vectors corresponding to said windings constitute two overlapping equilateral triangles, two co-phasal sides of said triangles constituting opposite sides of a square with the other sides of said triangles falling within the area of said square, the winding sides corresponding to the sides of the triangles falling within the area of said square being interconnected at the points of intersection of the corresponding sides, quarter-phase terminal connections for said windings at points thereon corresponding to the corners of said square, and an additional three-$m$-phase winding symmetrically arranged on said core, $m$ being an integer, said additional winding co-operating in transformer relation with the quarter-phase currents circulated through said quarter-phase terminal connections, the shorter and longer sections of each of said delta-connected phase windings being interspersed and interlinked with the corresponding secondary winding on the core legs.

7. Transformer apparatus comprising a three-phase core, a symmetrical delta-connected three-phase winding on said core, a second symmetrical delta-connected three-phase winding on said core, said two delta-connected windings being so interconnected that the voltage vectors corresponding to said windings constitute two overlapping equilateral triangles, two co-phasal sides of said triangles constituting opposite sides of a square with the other sides of said triangles falling within the area of said square, the winding sides corresponding to the sides of the triangles falling within the area of said square being interconnected at the points of intersection of the corresponding sides, and quarter-phase terminal connections for said windings at points thereon corresponding to the corners of said square, the longer and shorter winding sections of each of said interconnected delta windings being interspersed.

In testimony whereof I have hereunto subscribed by name this 27 day of July, A. D. 1927, at Zurich, Switzerland.

JULIUS JONAS.